United States Patent
Anghel et al.

(10) Patent No.: US 11,081,924 B2
(45) Date of Patent: Aug. 3, 2021

(54) METHOD AND APPARATUS TO REDUCE LOSSES IN A COMPACT HIGH SPEED GENERATOR

(71) Applicant: HONEYWELL INTERNATIONAL INC., Morris Plains, NJ (US)

(72) Inventors: Cristian Anghel, Oro Valley, AZ (US); Ming Xu, Oro Valley, AZ (US); Tom Phielix, Tucson, AZ (US); William Scherzinger, Oro Valley, AZ (US)

(73) Assignee: Honeywell International Inc., Charlotte, NC (US)

( * ) Notice: Subject to any disclaimer, the term of this patent is extended or adjusted under 35 U.S.C. 154(b) by 183 days.

(21) Appl. No.: 15/997,273

(22) Filed: Jun. 4, 2018

(65) Prior Publication Data
US 2019/0372416 A1 Dec. 5, 2019

(51) Int. Cl.
*H02K 3/493* (2006.01)
*H02K 1/16* (2006.01)

(52) U.S. Cl.
CPC .............. *H02K 3/493* (2013.01); *H02K 1/165* (2013.01)

(58) Field of Classification Search
CPC ............ H02K 3/34; H02K 3/345; H02K 3/48; H02K 3/487; H02K 3/49; H02K 3/493
See application file for complete search history.

(56) References Cited

U.S. PATENT DOCUMENTS

| | | |
|---|---|---|
| 917,138 A | 4/1909 | Robinson |
| 2,386,673 A * | 10/1945 | Fisher .................... H02K 3/493 310/214 |
| 3,665,576 A * | 5/1972 | Nordmann ............. H02K 3/487 29/729 |
| 4,159,562 A * | 7/1979 | Liptak ...................... H02K 3/48 29/596 |
| 4,293,787 A | 10/1981 | Ito et al. |
| 4,425,521 A | 1/1984 | Rosenberry, Jr. et al. |
| 4,427,910 A | 1/1984 | Richter et al. |

(Continued)

FOREIGN PATENT DOCUMENTS

| | | |
|---|---|---|
| DE | 410556 C | 3/1925 |
| FR | 556266 A | 7/1923 |

(Continued)

OTHER PUBLICATIONS

EP search and opinion, application No. 19177730.9, dated Oct. 9, 2019.

(Continued)

*Primary Examiner* — Tran N Nguyen
(74) *Attorney, Agent, or Firm* — Fogg & Powers LLC

(57) ABSTRACT

A retention component for retaining a coil in a slot of a stator for a generator having a rotor includes a first segment and a second segment, both of which are configured to be inserted into the slot. At least one of the first and second segments is made entirely of laminated sheets that together form a unitary structure of magnetic material. At least one of the first and second segments has an interfacing surface configured to directly interface a rotor surface in the absence of a structure therebetween. A channel is between the first and second segments, and a third segment that extends along and within the channel. The third segment is less magnetic or non-magnetic than at least one of the first and second elements.

20 Claims, 5 Drawing Sheets

(56) References Cited

U.S. PATENT DOCUMENTS

| | | | |
|---|---|---|---|
| 4,857,788 A | | 8/1989 | Hein et al. |
| 5,252,877 A | | 10/1993 | Sawa et al. |
| 5,365,135 A | * | 11/1994 | Konrad ............... H02K 3/48 |
| | | | 29/596 |
| 5,654,603 A | | 8/1997 | Sung et al. |
| 6,438,820 B1 | * | 8/2002 | Tong ................. H02K 3/487 |
| | | | 29/596 |
| 6,967,420 B2 | * | 11/2005 | Laurent ............ H02K 1/2773 |
| | | | 310/156.51 |
| 8,129,880 B2 | | 3/2012 | Rahman et al. |
| 9,509,189 B2 | | 11/2016 | Luise et al. |
| 2002/0047456 A1 | * | 4/2002 | Murayama .......... H02K 3/487 |
| | | | 310/214 |
| 2002/0074889 A1 | * | 6/2002 | Kikuchi ............. H02K 3/522 |
| | | | 310/214 |
| 2002/0096960 A1 | * | 7/2002 | Tong ................. H02K 3/493 |
| | | | 310/214 |
| 2004/0094325 A1 | * | 5/2004 | Yoshida ............... H02K 3/30 |
| | | | 174/120 R |
| 2010/0127592 A1 | | 5/2010 | Yu et al. |
| 2011/0215750 A1 | | 9/2011 | Anderson et al. |
| 2014/0028145 A1 | * | 1/2014 | Luise .................. H02K 3/493 |
| | | | 310/214 |

FOREIGN PATENT DOCUMENTS

| | | | |
|---|---|---|---|
| FR | 1430882 A | | 3/1966 |
| JP | 54118504 | * | 9/1979 ............... H02K 3/48 |

OTHER PUBLICATIONS

European Patent Office, "Communication pursuant to Article 94(3) EPC from EP Application No. 19177730.9", from Foreign Counterpart to U.S. Appl. No. 15/997,273, filed Aug. 26, 2020, p. 1 through 5, Published: EP.

* cited by examiner

METHOD AND APPARATUS TO REDUCE LOSSES IN A COMPACT HIGH SPEED GENERATOR

BACKGROUND OF THE INVENTION

The present invention generally relates to generators and, more particularly, to apparatus and methods of power generation with minimum weight and volume.

There is an increasing need for high power generators in the 500 kW to 1 MW range for hybrid-electric propulsion and directed energy weapons. At the same time, these applications require low weight and volume. The increased power levels dictate the requirement for high efficiency to allow cooling of the generator with minimal weight and volume impact due to the cooling system.

These requirements can be achieved with high-speed, high power density generators. One of the major design features required to realize the high power and high efficiency is the use of stator coils that have low losses, especially copper and eddy currents losses.

The coils have multiple numbers of turns. Installing these coils in the stator slots is possible only from the radial direction (i.e., dropping them from the top). In order to achieve this, as shown in FIG. 1, slots 12 of the stator 10 need to be open (i.e., partially or completely open), so the coils 11 can be installed from the radial direction. However, these open slots create a non-uniform air-gap 13 (i.e., air space between rotor 14 and stator 10) which results in a distorted magnetic flux, causing additional undesired losses in the electric machine.

To address the foregoing, as shown in FIG. 2, a stator 20, which is built of soft magnetic material laminations such as Hiperco 50, has used either a non-magnetic material, such as fiber glass, to form a wedge 25 to keep the coil 21 in place in the slot 22, or sometimes a semi-magnetic material. In both cases, as shown in FIG. 2, a wedge 25 made of the non-magnetic or semi-magnetic material is pushed axially into the cut-out 26 of the slot 22.

As can be seen, there is a need for improved apparatus and methods for minimizing weight and volume while maximizing efficiency in generators.

SUMMARY OF THE INVENTION

In one aspect of the present invention, a retention component for retaining a coil in a slot of a stator for a generator having a rotor comprises a first segment and a second segment, both of which are configured to be inserted into the slot; wherein at least one of the first and second segments is made entirely of laminated sheets that together form a unitary structure of magnetic material; wherein the at least one of the first and second segments has an interfacing surface configured to directly interface a rotor surface in the absence of a structure therebetween; a channel between the first and second segments; and a third segment that extends along and within the channel; wherein the third segment is less magnetic than the at least one of the first and second elements.

In a further aspect of the present invention, a generator having rotor and a stator comprises slots having a cut-out portion adjacent a slot opening; wherein the cut-out portion is V-shaped; a retention component configured to be inserted into the slot, wherein the retention component includes: a first segment and a second segment; wherein the first and second segments are made of a magnetic material; wherein at least one of the first and second segments has an inner lateral side and an outer lateral side; wherein the outer lateral side has two sloping planar surfaces in a V-shaped configured to mate with the cut-out portion of the slot; a longitudinally extending channel between the first and second segments; wherein the channel has an interfacing opening that interfaces a rotor surface in the absence of a structure therebetween; and a third segment that extends along and within the channel; wherein the third segment is rod-shaped and less magnetic than the first and second segments.

In another aspect of the present invention, a generator having a rotor and a stator comprises a plurality of tooth elements on the stator; a plurality of slots that alternate with the tooth elements; a retention component insertable into the slot and configured to retain a coil insertable into the slot, wherein the retention component includes: a first segment made of first laminated sheets of a first magnetic material; wherein the first segment includes a first outer lateral side having a V-shaped configuration; a second segment made of second laminated sheets of a second magnetic material; wherein the second segment includes a second outer lateral side having a V-shaped configuration; wherein one of the V-shaped configurations of the first and second segments has unequal length legs; a channel between the first and second segments; wherein the channel consists of planar walls and arcuate walls; and a third segment that is rod-shaped, and extends along and within the channel; wherein a diameter of the third segment is greater than a height of at least one of the first and second segments; wherein the third segment is made of a non-magnetic material; wherein the third segment interfaces a rotor surface in the absence of a structure therebetween.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides a stator with semi-closed slots as distinguished from fully open slots in the past. The present invention can use a combination of magnetic and non-magnetic material, such as fiber glass, to keep the coil in place. Alternatively, a semi-magnetic material can be used. In either case, a wedge made of the selected material can be pushed axially into a cut-out of the slot. The wedge of the present invention can use laminations identical with the ones used in a stator stack which are also installed axially into the same cut-out of the slot. The current invention improves the performance of the electric machine without adding the cost and mechanical disadvantages of the semi-magnetic materials. One disadvantage is brittleness and breaking easily contaminating the air-gap.

Figure 1:
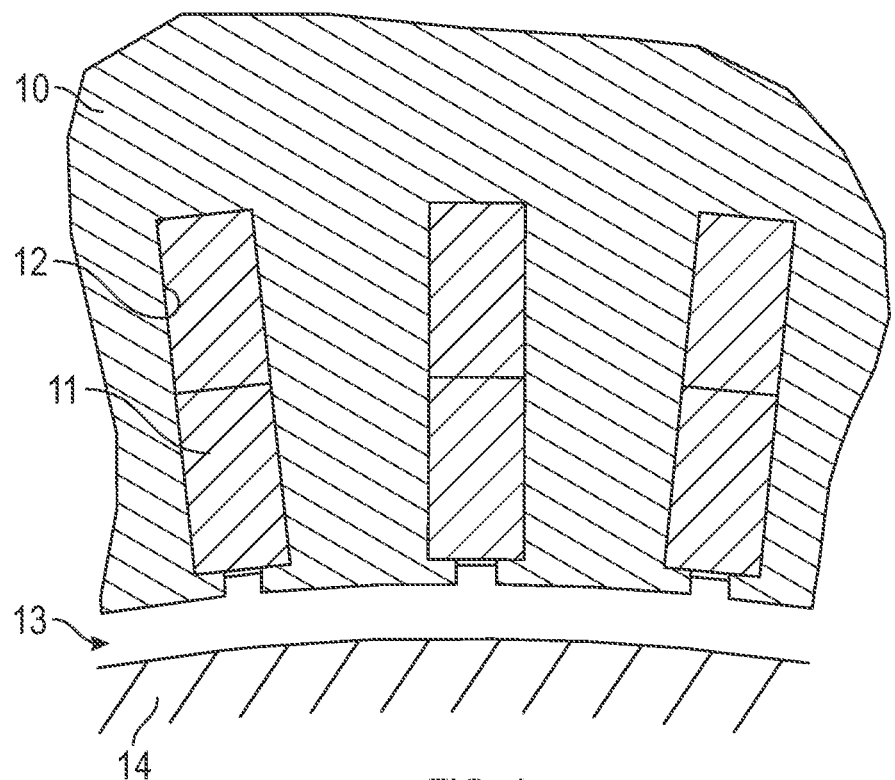
FIG. 1 is a schematic diagram of a stator for an electrical machine according to the prior art.
Figure 2:
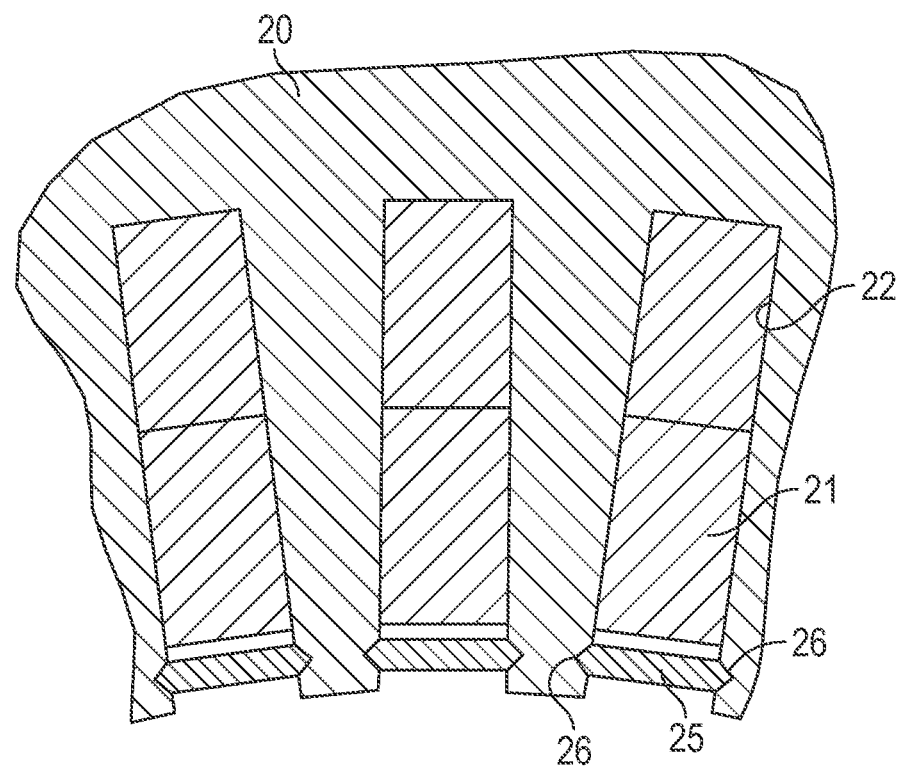
FIG. 2 is a schematic diagram of another stator for an electrical machine according to the prior art.
Figure 3A:
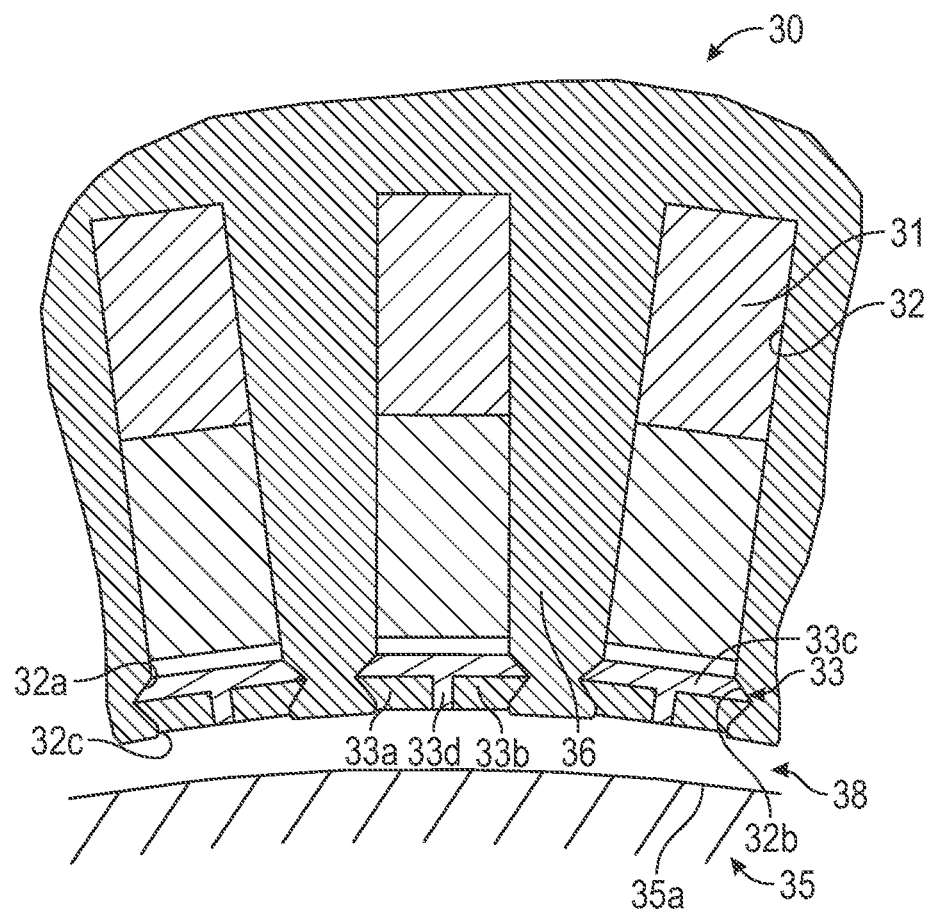
FIGS. 3A-3B are schematic diagrams of a stator, and a retention component thereof, for an electrical machine according to an embodiment of the present invention.
Figure 3B:
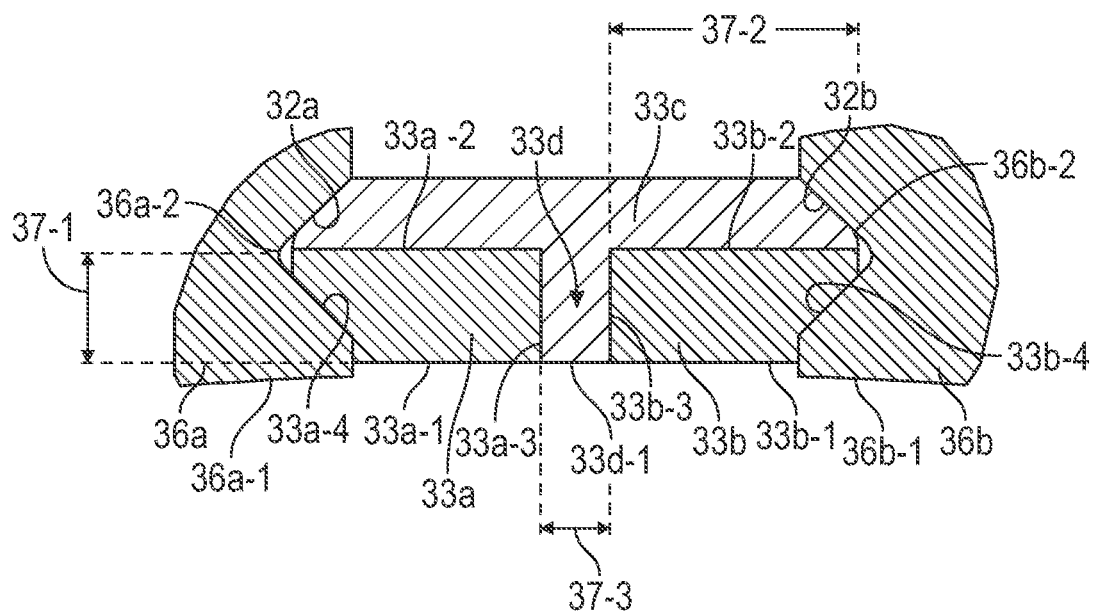

FIG. 3A is a schematic cross sectional view of a stator 30 according to an embodiment of the present invention. The stator 30 can be part of a generator having a rotor therein. FIG. 3B is a schematic cross sectional view of a retention component or wedge 33 that can be employed in a stator, such as the stator 30, according to an embodiment of the present invention.

In embodiments, as shown in FIG. 3A, the stator 30 may have alternating slots 32 and tooth elements 36. The slots 32 may be configured to hold a respective coil 31. The slots 32 may be further configured to receive coils 31 that have been inserted into the slots 32 in a radial direction of the stator 30.

In some embodiments, one or more of the slots 32 may have one or both of a first cut-out portion 32a and a second cut-out portion 32b. In embodiments, one or both of the cut-out portions 32a,b may have a V-shaped configuration. Either or both of the cut-out portions 32a,b may be disposed adjacent to a distal opening 32c of the slot 32.

The distal opening 32c may be configured to directly interface a rotor 35 and, in particular, a rotor surface 35a. Accordingly, there is only an air gap 38, and an absence of a structure, between the distal opening 32 and the rotor surface 35a.

One or more of the slots 32, and in particular their first and second cut-out portions 32a,b, may be configured to hold a retention component or wedge 33. The first and second cut-out portions 32a,b may be further configured to receive the wedge 33 upon it being inserted, axially, into the slot 32.

According to various embodiments, as shown in FIG. 3B, one or more of the retention components 33 may have a first segment 33a, a second 33b, a third segment 33c, and a channel 33d between the first and second segments 33a,b. In embodiments, the third segment 33c may be partially or wholly within the channel 33d. In other embodiments, the channel 33d may be located at a mid-point or central portion between a combined width of the first and second segments 33a,b.

The first segment 33a may be constructed with laminated sheets of a first magnetic material which form a first unitary structure of the first magnetic material. The second segment 33b may be constructed with laminated sheets of a second magnetic material which form a second unitary structure of the second magnetic material. In embodiments, the first and second magnetic materials are the same.

In embodiments, one or both of the first and second segments 33a,b are constructed entirely of laminated sheets of magnetic material with no other type of material between the laminated sheets, except for an adhesive or other bonding material to hold the sheets together. In embodiments, one or both of the first and second segments 33a,b may have planar sides in laminated sheets that are disposed generally perpendicular to a longitudinal axis of the wedge 33. The longitudinal axis of the wedge 33 may run generally parallel to a longitudinal axis of the stator 30.

According to embodiments, and in the event the stator 30 is made of laminated sheets, the laminated sheets of the first and/or second segments 33a,b may have a thickness equal to a thickness of laminated sheets of the stator 30. Further, the planar sides of the stator laminated sheets may be generally parallel to the planar sides of the laminated sheets of the first and/or second segments.

In embodiments, the first segment 33a may have a configuration that is a mirror image of the second segment 33b. Accordingly, the first and second segments may respectively have a first segment interfacing surface 33a-1 and a second segment interfacing surface 33b-1. The interfacing surfaces 33a-1, 33b-1 may be disposed at the distal opening 32c of the slot 32, and may be configured to directly interface the rotor surface 35a in the absence of a structure therebetween. In embodiments, one or both of the interfacing surfaces 33a-1, 33b-1 consists of only a single planar surface.

The first and second segments 33a,b may also respectively have a first segment non-interfacing surface 33a-2 and a second segment non-interfacing surface 33b-2. In embodiments, one or both of the non-interfacing surfaces consist of only a single planar surface. In embodiments, the planar surface of the interfacing surface(s) 33a-1, 33b-1 can be generally parallel to the planar surface of the non-interfacing surface(s) 33a-2, 33b-2.

In some embodiments, the first and second segments 33a,b may respectively have a first segment inner lateral side 33a-3 and a second segment inner lateral side 33b-3. One or both of the inner lateral sides may be partially or wholly planar surfaces. One or both of the inner lateral sides may be generally perpendicular to one or both of the non-interfacing surfaces 33a-2, 33b-2. Further, the inner lateral sides 33a-3, 33b-3 may form side walls of the channel 33d.

A first segment outer lateral side 33a-4 and a second segment outer lateral side 33b-4, of the first and second segments 33a,b, may be respectively opposite to the inner lateral sides 33a-3, 33b-3. In embodiments, one or both of the outer lateral sides 33a-4, 33b-4 has at least one planar sloping surface. In embodiments, the sloping surface may be disposed, to its respective interfacing surface 33a-1, 33b-1, at an obtuse angle. Thereby, the sloping surface may mate with a respective V-shaped cut-out portion 32a,b of the slot 32.

In FIG. 3B, the third segment 33c may be constructed of a material that is less magnetic than one or both of the first and second segments 33a,b. In embodiments, the third segment 33c is made of a non-magnetic material. In yet other embodiments, the third segment 33c is made of a semi-magnetic material.

According to some embodiments, the third segment 33c can be T-shaped (FIGS. 3A-3B). In embodiments, the leg portion of the T-shaped segment 33c may be configured and dimensioned to fit in the channel 33d. The cross-bar portion of the T-shaped segment 33c may directly interface the first and second non-interfacing surfaces 33a-2, 33b-2 of the first and second segments 33a,b. Further, the cross bar portion may directly interface the cut-out portions 32a,b of the slot 32.

The channel 33d, according to the exemplary embodiment of FIGS. 3A-3B may generally be rectangular, square or trapezoidal in cross-section. The channel 33d may have an interfacing opening 33d-1 at the interfacing surfaces 33a-1, 33b-1 of the first and second segments 33a,b. The interfacing opening 33d-1 may be located at a mid-point or central area between the outer lateral sides 33a-4, 33b-4. The interfacing opening 33d-1 may directly interface the rotor surface 35a without a structure therebetween.

Still referring to FIG. 3B, one or more of the tooth elements 36 may have a first distal portion 36a and/or a second distal portion 36b. The first and/or the second distal portions 36a,b may be positioned adjacent to and between a pair of slots 32. In particular, the distal portions of the tooth element may be positioned adjacent the distal openings 32c of the pair of slots 32.

In embodiments, the first and second distal portions 36a,b may have, respectively, a first distal portion interfacing surface 36a-1 and a second distal portion interfacing surface 36b-1. One or both of the interfacing surfaces 36a-1, 36b-1 may directly interface the rotor surface 35a in the absence of a structure therebetween. In embodiments, one or both of the interfacing surfaces 36a-1, 36b-1 consists of a single planar surface configuration.

Further, the first and second distal portions of one or more tooth elements 36 may have a respective first distal portion inner lateral side 36a-2 and a second distal portion inner lateral side 36b-2. One or both of the inner lateral sides 36a-2, 36b-2 may have a sloping, planar surface. In embodiments, one or both of the inner lateral sides may have a V-shaped configuration. Thereby, the inner lateral sides 36a-2, 36b-2 may mate with the outer lateral sides 33a-4, 33b-4 of the first and second segments 33a,b.

Figure 4A:
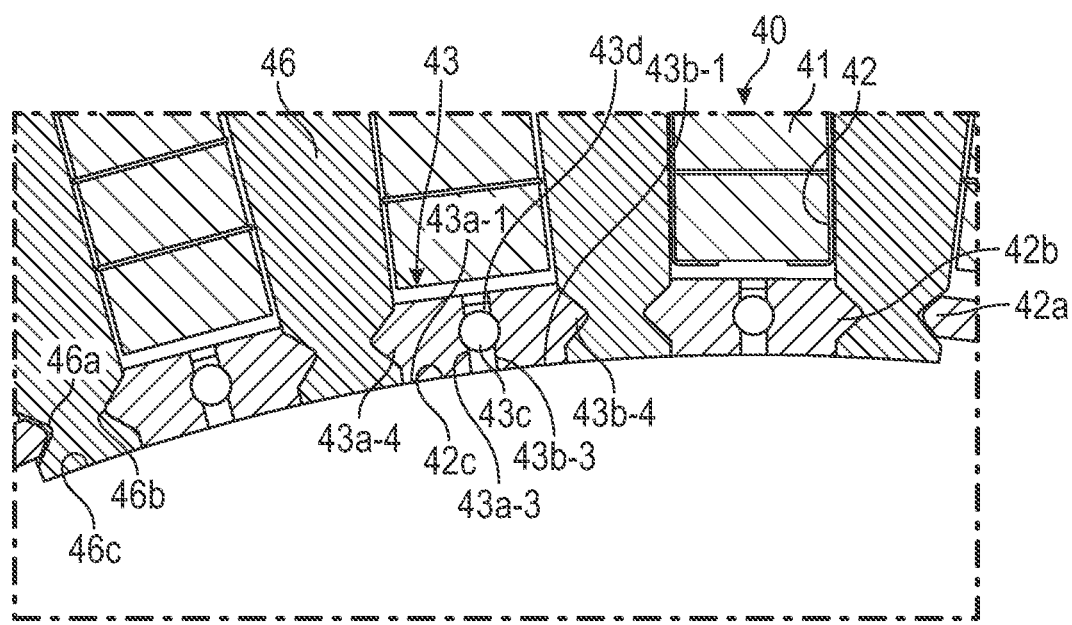
FIGS. 4A-4E are schematic diagrams of a stator, and a retention component thereof, for an electrical machine according to another embodiment of the present invention.
Figure 4B:
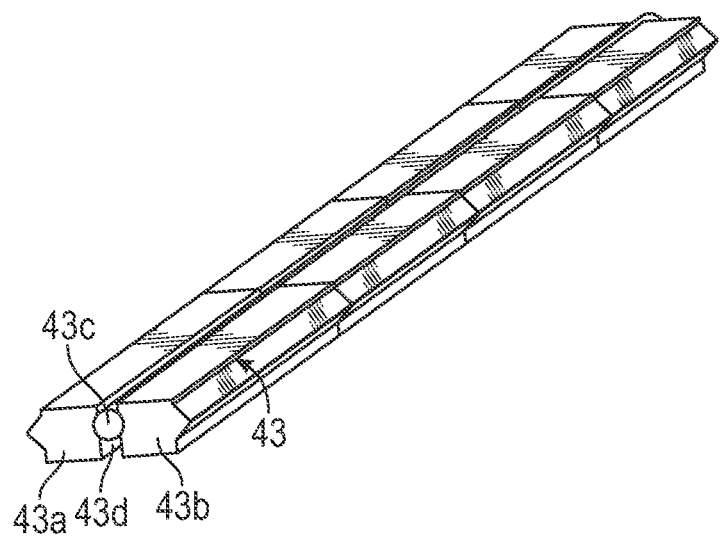
Figure 4C:
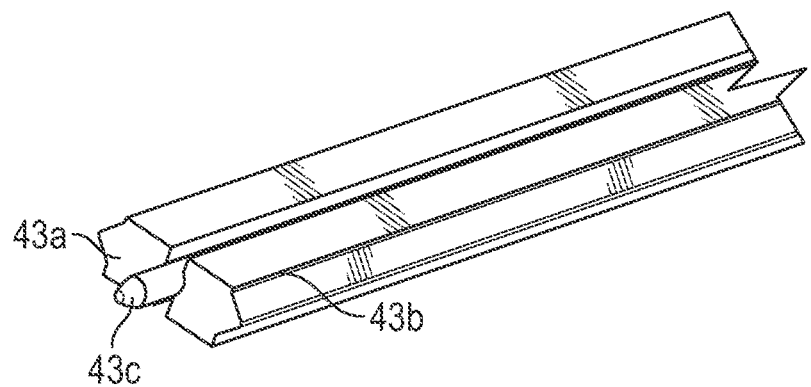
Figure 4D:
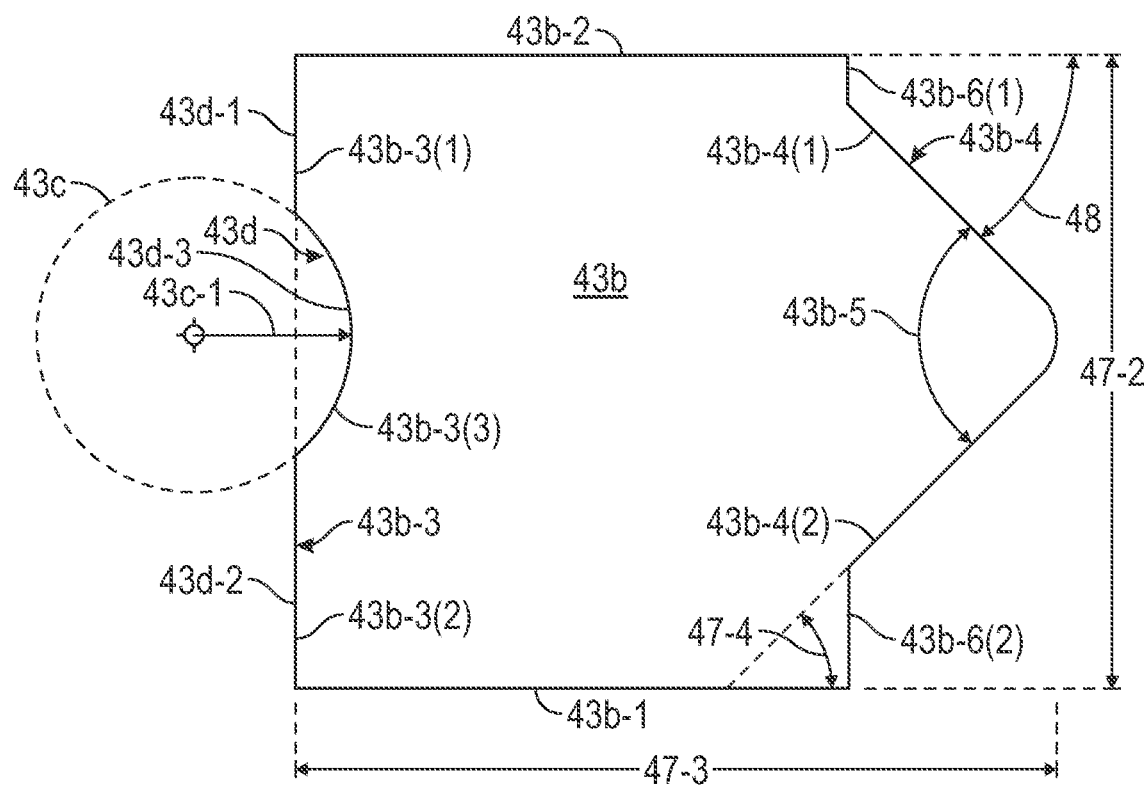
Figure 4E:
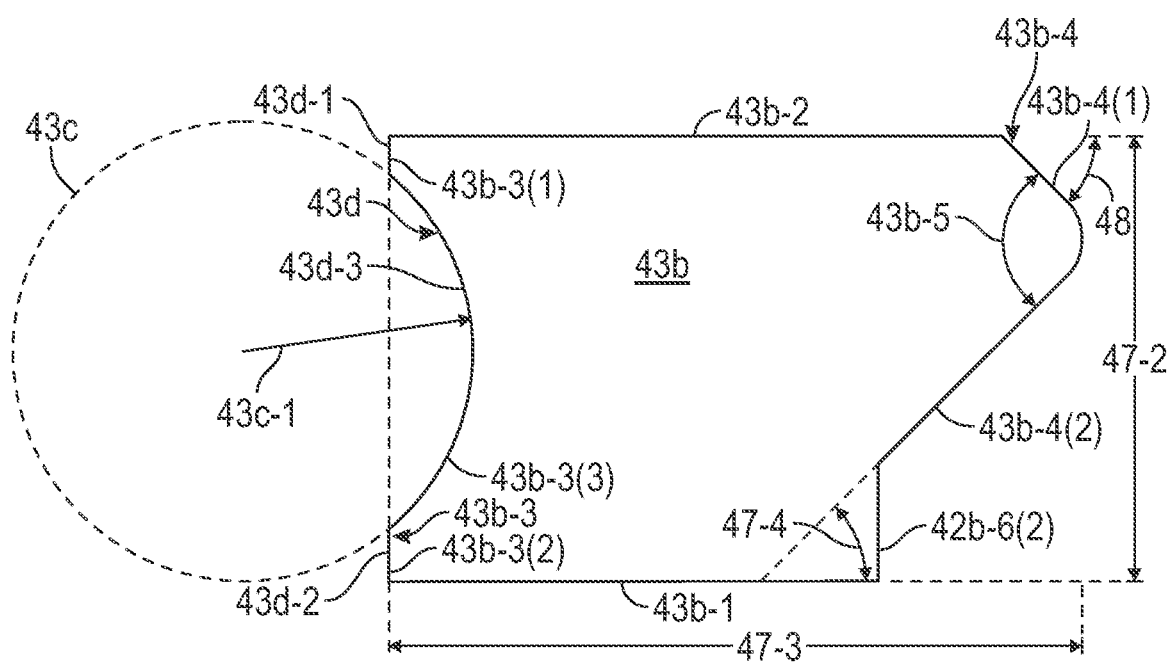

In FIGS. 4A-4E, an exemplary stator 40 and retention component or wedge 43 are shown and may be similar to that described in relation to FIGS. 3A-3B. Accordingly, reference numbers in FIGS. 4A-4E correspond to like reference numbers in FIGS. 3A-3B. For purposes of brevity and clarity, FIGS. 4D-4E depict only a portion of the wedge 43—a second segment and a third segment.

As seen in FIG. 4A, the stator 40 may have alternating slots 42 and tooth elements 46. One or more of the slots 42 may have one or both of a first cut-out portion 42a and a second cut-out portion 42b. In embodiments, one or both of the cut-out portions 42a,b may have a V-shaped configuration. Either or both of the cut-out portions 42a,b may be disposed adjacent to a distal opening 42c of the slot 42.

The distal opening 42c may be configured to directly interface a rotor and, in particular, a rotor surface. Accordingly, there is only an air gap, and an absence of a structure, between the distal opening 42c and the rotor surface.

As seen in FIGS. 4A-4B, one or more of the first and second cut-out portions 42a,b, may be configured to hold the retention component or wedge 43. One or more of the retention components 43 may have a first segment 43a, a second 43b, a third segment 43c, and a channel 43d between the first and second segments 43a,b. In embodiments, the third segment 43c may be wholly within the channel 43d. In some embodiments, the channel 43d may be located at a mid-point or central portion between a combined width of the first and second segments 43a,b.

As shown in FIG. 4B, the third segment 43c may have a rod-shaped configuration and which can mate with arcuate wall portions of the channel 43d. In embodiments, an end of the third segment 43c may be tapered (FIG. 4C).

The first segment 43a may be constructed with laminated sheets of a first magnetic material and which sheets form a first unitary structure of the first magnetic material. The second segment 43b may be constructed with laminated sheets of a second magnetic material and which sheets form a second unitary structure of the second magnetic material. In embodiments, one or both of the first and second segments 43a, 43b may be defined by a height 47-2 and a width 47-3 (FIGS. 4D-4E).

In embodiments, the first and second segments may respectively have a first segment interfacing surface 43a-1 and a second segment interfacing surface 43b-1. The interfacing surfaces 43a-1, 43b-1 may be configured to directly interface the rotor surface in the absence of a structure therebetween. In embodiments, one or both of the interfacing surfaces 43a-1, 43b-1 consists of only a single planar surface configuration.

The first and second segments 43a,b may also respectively have a first segment non-interfacing surface and a second segment non-interfacing surface (e.g., 43b-2). In embodiments, one or both of the non-interfacing surfaces consists of only a single planar surface configuration. In embodiments, the planar surface of the non-interfacing surface(s) (e.g., 43b-2) is generally parallel to the planar surface of the interfacing surface(s) (e.g., 43b-1). In some embodiments, a length of the non-interfacing surface may be the same as a length of the interfacing surface (FIG. 4D), or the lengths may be different (FIG. 4E).

In some embodiments, the first and second segments 43a,b may further have a respective first segment inner lateral side and a second segment inner lateral side (e.g., 43b-3). One or both of the inner lateral sides may be partially planar surfaces and partially arcuate surfaces. In certain embodiments, such as seen in FIGS. 4D-4E, one or both of the inner lateral sides may consist of one arcuate surface (e.g., 43b-3(3)) between a pair of planar surfaces (e.g., 43b-3(1), (2)). The planar surfaces 43b-3(1), (2) may be of the same or different (FIGS. 4D-4E) lengths.

Further, the inner lateral sides (e.g., 43b-3) of the first and second segments 43a,b may form a respective curved or arcuate wall (e.g., 43d-3) and respective planar side walls (e.g., 43d-1, 43d-2) that may consist of the channel 43d. In embodiments, the curved wall 43d-3 may be defined by a radius 43c-1 of the third segment 43c.

The first and second segments 43a,b may further have a first segment outer lateral side and a second segment outer lateral side (e.g., 43b-4), which may be opposite to the inner lateral sides (e.g., 43b-3). In embodiments, one or both of the outer lateral sides can have at least one planar sloping surface. In embodiments, such as seen in FIGS. 4D-4E, the lateral sides (e.g., 43b-4) can have two planar sloping surfaces 43b-4(1), 43b-4(2). In embodiments, the sloping surfaces may be of the same (FIG. 4D) or different lengths (FIG. 4E).

In certain embodiments, such as seen in FIGS. 4D-4E, the sloping surfaces 43b-4(1), 43b-4(2) may be joined at an angle 43b-5 between the sloping surfaces, such as in a V-shaped configuration and with a rounded top having a radius. In one embodiment, the angle 43b-5 is about 90°. The sloping surface(s) may also be disposed, to its (their) respective interfacing surface (e.g., 43b-1), at an acute angle 47-4 (FIGS. 4D-4E). The sloping surface(s) may also be disposed, to its (their) respective non-interfacing surface 43a-2, 43b-2, at an obtuse angle 48 (FIGS. 4D-4E). Thereby, the sloping surface(s) may mate with a respective V-shaped cut-out portion 42a,b of the slot 42.

According to embodiments, one or both of the outer lateral sides (e.g., 43b-4) may have one (FIG. 4E) or more (FIG. 4D) planar non-sloping surfaces (e.g., 43b-6(1), 43b-6(2)). "Non-sloping" is intended to mean the surface is generally perpendicular (rather than obtuse or acute) to the interfacing and non-interfacing surfaces (e.g., 43b-1, 43b-2). In embodiments, one or both of the non-sloping surfaces (e.g., 43b-6(1), 43b-6(2)) may be positioned on one or both sides of the planar sloping surfaces (e.g., 43b-4(1), 43b-4(2)). The non-sloping surfaces may be of the same or different lengths.

It should be understood, of course, that the foregoing relates to exemplary embodiments of the invention and that modifications may be made without departing from the spirit and scope of the invention as set forth in the following claims.

We claim:

1. A retention component for retaining a coil in a slot of a stator for a generator having a rotor, the retention component comprising:
    a first segment and a second segment, both of which are configured to be inserted into the slot;
    wherein at least one of the first and second segments is made entirely of laminated sheets that together form a unitary structure of magnetic material;
    wherein the at least one of the first and second segments has an interfacing surface configured to directly interface a rotor surface in an absence of a structure therebetween;
    a channel between the first and second segments; and
    a third segment that extends along and within the channel, wherein the third segment directly contacts the first and second segments;
    wherein the third segment is less magnetic than the at least one of the first and second segments and at least one portion of the channel extends between sidewalls of the first and second segments that are not in contact with the third segment; and
    wherein the third segment is insertable into the channel, where insertion of the third segment into the channel secures the first segment and the second segment within the slot by pushing the first segment and the second segment against surfaces of the slot.

2. The component of claim 1, wherein the at least one of the first and second segments has an outer lateral side with only one sloping planar surface at an obtuse angle to the interfacing surface.

3. The component of claim 1, wherein the at least one of the first and second segments has an outer lateral side with two sloping planar surfaces, of which one of the two planar surfaces is at an acute angle to the interfacing surface.

4. The component of claim 1, wherein the third segment has a T-shaped configuration.

5. The component of claim 1, wherein the third segment has a rod-shaped configuration.

6. The component of claim 1, wherein the channel has straight, parallel walls.

7. The component of claim 1, wherein the channel has arcuate facing walls.

8. A stator for a generator having a rotor, comprising:
    a slot having a cut-out portion adjacent a slot opening;
    wherein the cut-out portion is V-shaped; and
    a retention component configured to be inserted into the slot, wherein the retention component includes:
    a first segment and a second segment;
    wherein the first and second segments are made of a magnetic material;
    wherein at least one of the first and second segments has an inner lateral side and an outer lateral side;
    wherein the outer lateral side has two sloping planar surfaces in a V-shaped configured to mate with the cut-out portion of the slot;
    a longitudinally extending channel between the first and second segments;
    wherein the channel has an interfacing opening that interfaces a rotor surface in an absence of a structure therebetween; and
    a third segment that extends along and within the channel, wherein the third segment directly contacts the first and second segments;
    wherein the third segment is rod-shaped and less magnetic than the first and second segments, and at least one portion of the longitudinally extending channel extends between sidewalls of the first and second segments that are not in contact with the third segment;
    wherein the third segment is insertable into the channel, where insertion of the third segment into the channel secures the outer lateral side of the first segment and the outer lateral side of the second segment against surfaces of the cut-out portion of the slot.

9. The stator of claim 8, wherein the first and second segments are each made entirely of laminated sheets of the magnetic material.

10. The stator of claim 8, wherein the at least one of the first and second segments has an interfacing surface configured to directly interface a rotor surface in the absence of a structure therebetween.

11. The stator of claim 8, wherein the outer lateral side has at least one non-sloping planar surface configured to mate with the cut-out portion of the slot.

12. The stator of claim 8, wherein the first and second segments have respective interfacing surfaces configured to directly interface a rotor surface in the absence of a structure therebetween.

13. The stator of claim 8, wherein the third segment is made of a non-magnetic material.

14. The stator of claim 8, wherein the channel has arcuate facing walls.

15. A generator having a rotor and a stator, comprising
    a plurality of tooth elements on the stator;
    a plurality of slots that alternate with the tooth elements; and
    a retention component insertable into the slot and configured to retain a coil insertable into the slot, wherein the retention component includes:
    a first segment made of first laminated sheets of a first magnetic material;
    wherein the first segment includes a first outer lateral side having a V-shaped configuration;
    a second segment made of second laminated sheets of a second magnetic material;
    wherein the second segment includes a second outer lateral side having a V-shaped configuration;
    wherein one of the V-shaped configurations of the first and second segments has unequal length sides;
    a channel between the first and second segments;
    wherein the channel consists of planar walls and arcuate walls; and
    a third segment that is rod-shaped, and extends along and within the channel, directly contacting the first and second segments, wherein the planar walls are not in contact with the third segment, where the third segment is insertable into the channel, where insertion of the third segment into the channel secures the first outer lateral side and the second outer lateral side against surfaces of the slot;
    wherein a diameter of the third segment is greater than a height of at least one of the first and second segments;
    wherein the third segment is made of a non-magnetic material;
    wherein the third segment interfaces a rotor surface in an absence of a structure therebetween.

16. The generator of claim 15, wherein the first magnetic material is the same as the second magnetic material.

17. The generator of claim 15, wherein the first and second laminated sheets have respective planar surfaces that are disposed perpendicular to a longitudinal axis of the retention component.

18. The generator of claim 15, wherein:
   wherein the first segment includes an inner lateral side having an arcuate portion; and
   wherein the second segment includes an inner lateral side having an arcuate portion.

19. The generator of claim 15, wherein the first and second segments have respective planar interfacing surfaces parallel to planar non-interfacing surfaces.

20. The generator of claim 15, wherein the first and second segments have mirror image configurations.

* * * * *